United States Patent
Powell et al.

(10) Patent No.: US 11,142,106 B2
(45) Date of Patent: Oct. 12, 2021

(54) AIR FLOW FOR VENT/COOLED SEATING

(71) Applicant: LEAR CORPORATION, Southfield, MI (US)

(72) Inventors: Michael R. Powell, Waterford, MI (US); Samuel Hanlon, Livonia, MI (US); Vyachislav Ivanov, West Bloomfield, MI (US); Thomas Korycinski, Southfield, MI (US); Lisa Townley, Allen Park, MI (US)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 16/721,218

(22) Filed: Dec. 19, 2019

(65) Prior Publication Data
US 2021/0188138 A1    Jun. 24, 2021

(51) Int. Cl.
*B60N 2/56*    (2006.01)

(52) U.S. Cl.
CPC ................... *B60N 2/5642* (2013.01)

(58) Field of Classification Search
CPC ........ A47C 27/15; A47C 21/046; A47C 27/22
See application file for complete search history.

(56) References Cited

U.S. PATENT DOCUMENTS

| | | | | |
|---|---|---|---|---|
| 3,204,259 A | * | 9/1965 | Gordon | A47C 23/00 482/15 |
| 5,000,515 A | * | 3/1991 | Deview | B29C 44/0469 297/452.27 |
| 5,002,336 A | * | 3/1991 | Feher | A47C 7/744 297/180.13 |
| 5,169,580 A | * | 12/1992 | Marcus | A47G 9/00 264/115 |
| 5,492,662 A | | 2/1996 | Kargol et al. | |
| 5,679,197 A | * | 10/1997 | Haupt | B29C 63/0091 156/212 |
| 5,833,321 A | | 11/1998 | Kim et al. | |
| 6,064,037 A | * | 5/2000 | Weiss | A47C 7/74 219/217 |
| 6,269,504 B1 | * | 8/2001 | Romano | A47C 27/122 5/653 |
| 7,478,869 B2 | * | 1/2009 | Lazanja | B60N 2/5635 297/180.13 |
| 7,587,901 B2 | * | 9/2009 | Petrovski | B60H 1/2218 62/3.3 |

(Continued)

FOREIGN PATENT DOCUMENTS

| | | |
|---|---|---|
| CN | 101115642 A | 1/2008 |
| JP | 2010240089 A | 10/2010 |

(Continued)

*Primary Examiner* — Shin H Kim
(74) *Attorney, Agent, or Firm* — Brooks Kushman P.C.

(57) ABSTRACT

A padding component for intelligent distribution of airflow in a vehicle seat, optimizing the sensation of airflow for the occupant. This includes a top layer, a bottom layer, and a fibrous layer interposed between the top layer and the bottom layer. The fibrous layer defines airflow channels having a first filament density and non-channel regions having a second filament density. Characteristically, the second filament density is greater than the first filament density such that air preferentially flow through the airflow channels.

20 Claims, 5 Drawing Sheets

(56) References Cited

U.S. PATENT DOCUMENTS

| | | | |
|---|---|---|---|
| 7,661,764 B2* | 2/2010 | Ali | B60N 2/986 |
| | | | 297/452.26 |
| 7,934,774 B2* | 5/2011 | Galbreath | B60N 2/70 |
| | | | 297/452.27 |
| 8,066,324 B2* | 11/2011 | Nathan | H05B 1/0238 |
| | | | 297/180.12 |
| 9,446,691 B2* | 9/2016 | Sano | B60N 2/818 |
| 9,821,832 B2* | 11/2017 | Davignon | B32B 9/025 |
| 10,045,633 B2* | 8/2018 | Allman | B29C 70/70 |
| 10,195,970 B2* | 2/2019 | Bauer | B60N 2/5621 |
| 10,589,647 B2* | 3/2020 | Wolas | B60N 2/5628 |
| 10,736,435 B2* | 8/2020 | Duncan | B60N 2/7094 |
| 2006/0175877 A1 | 8/2006 | Alionte et al. | |
| 2007/0011813 A1* | 1/2007 | Rathle | A47G 9/10 |
| | | | 5/640 |
| 2007/0188007 A1* | 8/2007 | Lazanja | B60N 2/5621 |
| | | | 297/452.42 |
| 2009/0001778 A1* | 1/2009 | Nathan | H05B 1/0238 |
| | | | 297/180.12 |
| 2009/0134675 A1* | 5/2009 | Pfahler | B60N 2/5635 |
| | | | 297/180.1 |
| 2009/0152909 A1* | 6/2009 | Andersson | B60N 2/565 |
| | | | 297/180.13 |
| 2009/0302646 A1* | 12/2009 | Baur | B60N 2/5685 |
| | | | 297/180.1 |
| 2011/0173757 A1* | 7/2011 | Rensink | A47C 27/15 |
| | | | 5/698 |
| 2014/0053341 A1* | 2/2014 | Parvin | B29D 99/0092 |
| | | | 5/740 |
| 2014/0152058 A1* | 6/2014 | Line | B60N 2/5614 |
| | | | 297/180.12 |
| 2016/0096462 A1* | 4/2016 | Kromm | B60N 2/5816 |
| | | | 297/452.38 |
| 2018/0022251 A1* | 1/2018 | Kienzler | B60N 2/565 |
| | | | 297/180.12 |
| 2020/0086773 A1* | 3/2020 | Mankame | B60N 2/7017 |

FOREIGN PATENT DOCUMENTS

| | | |
|---|---|---|
| KR | 20180041926 A | 4/2018 |
| WO | 2010113347 A1 | 10/2010 |

* cited by examiner

AIR FLOW FOR VENT/COOLED SEATING

TECHNICAL FIELD

In at least one aspect, the present invention is related to vehicle seat venting and cooling systems.

BACKGROUND

Vented and/or cooled seats are becoming an important vehicle option to enhance vehicle aesthetics and comfort, Although these seats function reasonably well, the seats experience a loss and control of air to certain areas of the seat. Whether the air is heated, cooled or just ambient vented air, typical seating layers experience extreme inefficiencies of airflow throughout various areas of the seat. These typical layers can also restrict the airflow as does the crushing of the seating layers due to the seat being occupied.

Accordingly, there is a need for an improved more intelligent method for distributing and venting vehicle seats that avoid the prior art issues.

SUMMARY

The present invention solves one or more problems of the prior art by providing a padding component for intelligently distributing airflow in a vehicle seat. The padding component includes a top layer, a bottom layer, and a fibrous layer interposed between the top layer and the bottom layer. The top layer typically defines a plurality of exit openings that allow air to exit the airflow channels in strategic locations. The fibrous layer defines airflow channels that uniquely allow air to flow purposefully to specific areas of exit, having a first filament density and non-channel regions having a second filament density. Characteristically, the second filament density is greater than the first filament density, such that the padding component directs air to certain areas of the seat and less in others.

In another aspect, mechanical comfort can be provided by integrating a topper pad function. This product can intelligently distribute air to specific zones as well as provide a premium comfort offering.

In another aspect, the padding component with or without channels can function as an air diffuser. Exit holes can be strategically located and sized where the exiting air can provide optimum venting to the occupant while requiring the least amount of energy.

BRIEF DESCRIPTION OF THE DRAWINGS

For a further understanding of the nature, objects, and advantages of the present disclosure, reference should be had to the following detailed description, read in conjunction with the following drawings, wherein like reference numerals denote like elements and wherein.

DETAILED DESCRIPTION

Figure 1:
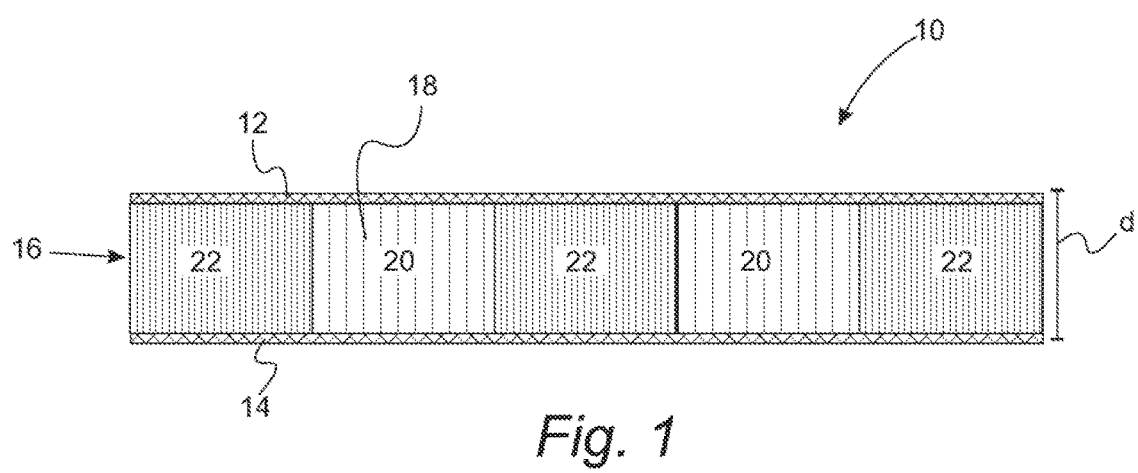
FIG. 1 is a schematic cross section of an intelligent air distribution with or without additional padding component having intelligent channels for directing air to predefined regions of a vehicle seat.

Reference will now be made in detail to embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," Where one of these three terms are used herein, the presently disclosed and claimed subject matter can include the use of either of the other two terms.

The term "density" is defined in this application as filament diameter as well as proliferation of the amount of filament per square in this component and/or a combination of both.

The term "filament" is referring to yarns, threads or any material that can be knitted. Examples are: polyester, cotton/ polyester blends, cotton/spandex blends, wool, nylon, rayon, conductive, monofilaments, bi-components, multi-filaments and combinations thereof throughout each respective layer Throughout this application, where publications are referenced, the disclosures of these publications in their entireties are hereby incorporated by reference into this application to more fully describe the slate of the art to which this invention pertains.

With reference to FIG. 1, a padding component for distributing airflow in a vehicle seat is provided. Padding component 10 includes top layer 12, bottom layer 14, and fibrous layer 16 interposed between the top layer and the bottom layer. Typically, the fibrous layer 16 includes a plurality of filaments 18 that extend from bottom layer 14 to top layer 12. Fibrous layer 16 defines airflow channels 20 having a first filament density and non-channel regions 22 having a second filament density. Airflows preferentially through airflow channels 20 with less airflowing through non-channel regions 22. The airflowing therethrough can be ambient, heated air or cooled air. Characteristically, the second filament density is greater than the first filament density. In this regard, filament density refers to the number of filaments per unit volume. In a refinement, the second filament density is at least 5 times greater than the first filament density. In another refinement, the second filament density is at least 10 times greater than the first filament density. In other refinements, the second filament density is at least in increasing order of preference 5, 10, 20, 30, 50, 100, or 200 times greater than the first filament density and at most 2000, 1000, 700, 500, 400, 300, or 250 times greater than the first filament density. Typically, the fibrous layer 16 includes a plurality of filaments that extend from bottom layer 14 to top layer 12. In a refinement, padding component 10 has a thickness d from about 6 mm to about 40 mm.

In a refinement, top layer 12 and bottom layer 14 are each independently knitted fabric layers. Although the present embodiment is not limited to any particular type of knitted fabric, examples of knitted fabrics for the top layer and bottom layer are independently polyester, cotton/polyester blends, cotton/spandex blends, wool, nylon, rayon, conductive, monofilaments, bi-components, multi-filaments and combinations thereof. Polyester is found to be particularly suitable for vehicle seat applications.

Figure 2A:
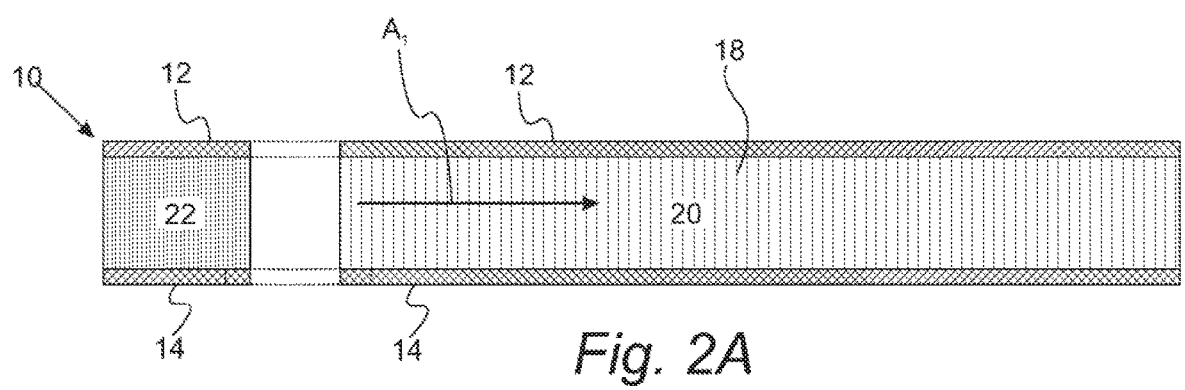
FIG. 2A is a schematic cross-section of a padding component through an airflow channel illustrating an inlet opening for positioning an air distributor.
Figure 2B:
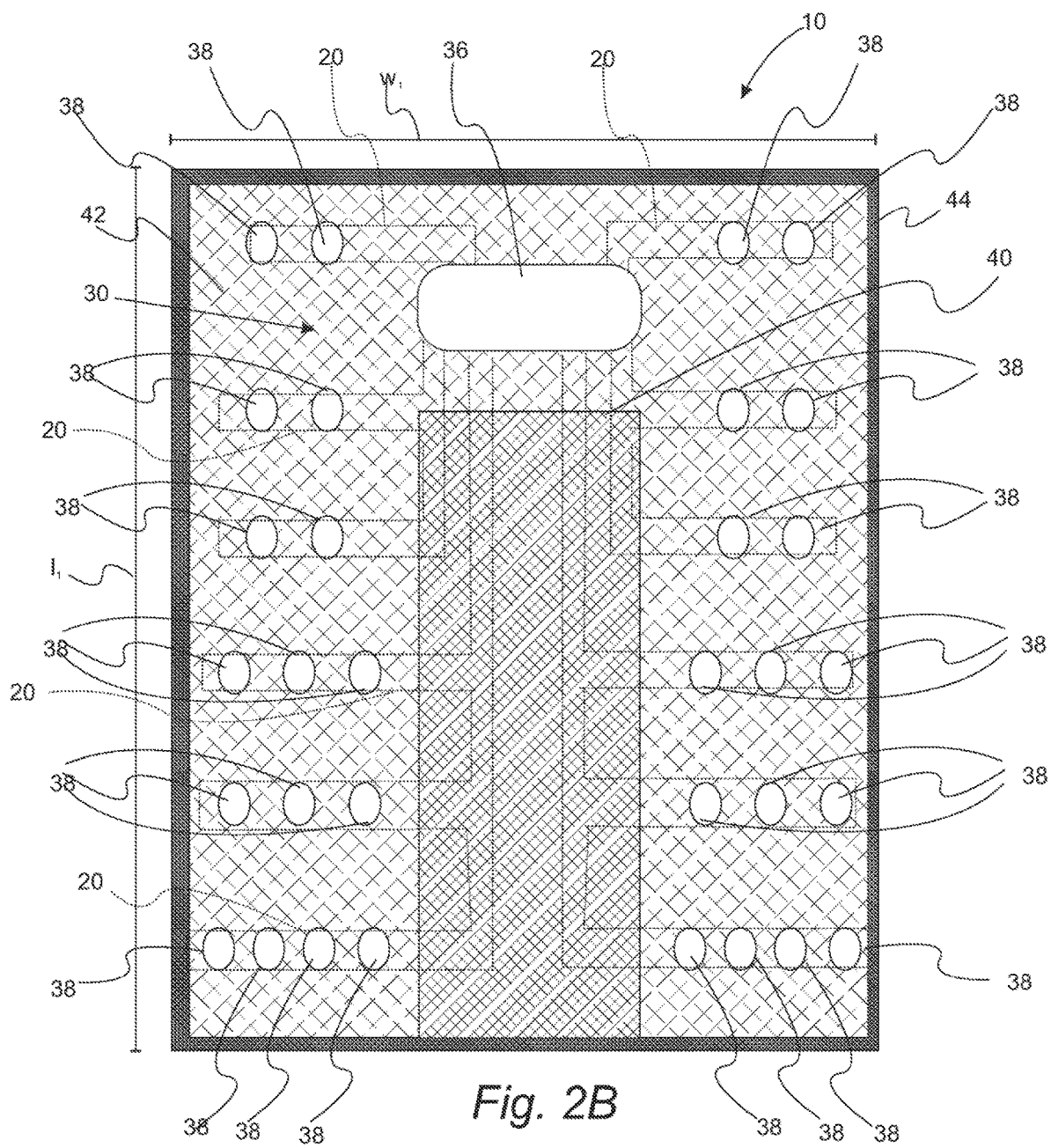
FIG. 2B is a top view of a padding component having intelligent channels for directing air to predefined regions of a vehicle seat showing inlet opening for positioning an air distributor.
Figure 2C:
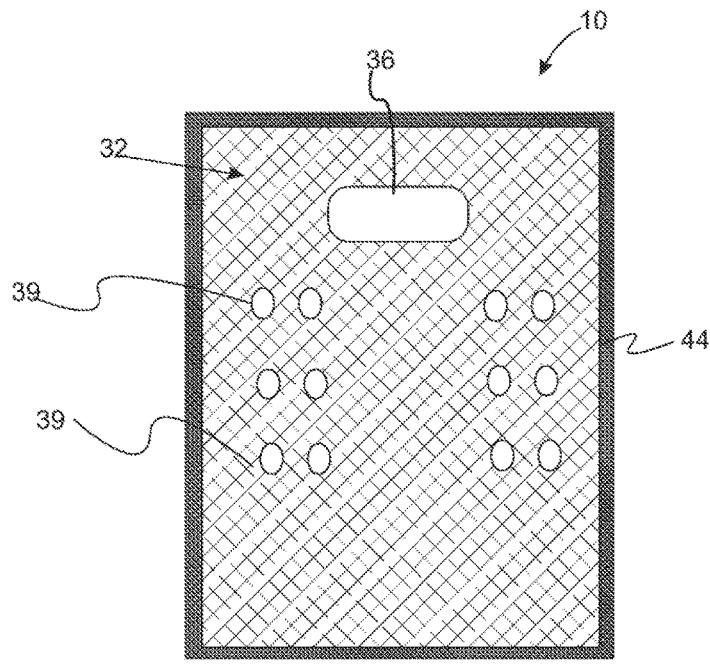
FIG. 2C is a bottom view of a padding component having intelligent channels for directing air to predefined regions of a vehicle seat showing one example of an inlet opening for positioning an air distributor.

FIGS. 2A, 2B, and 2C provide side, top and bottom views of padding component 10. Padding component 10 includes top surface 30 and bottom surface 32. Padding layer 10 defines an inlet opening 36 that allows access to ends of the airflow channels so that airflows therein as indicated by arrow $A_1$. In this regard, an opening is formed defined in fibrous layer 16 and one or both of top layer 12 and bottom layer 14. A flow distributor as depicted below can be positioned in the inlet opening in order to provide the flowing air. In a refinement, top layer 12 defines a plurality of exit openings 38 that allow air to exits the airflow channels 20. Exit openings 38 can overlay airflow channels 20 or are proximate to airflow channels 20. In a refinement, bottom layer 14 defines one or more inlet openings 39 at predefined locations.

Although the present embodiment is not limited by dimensions, typically padding component 10 has a length $l_1$ from about 100 to 800 mm and a width $w_1$ from about 200 to 800 mm.

Similarly, inlet opening 36 can have a width from about 40 to 100 mm. Rows of exit opening 38 are typically separated from each other by a distance of 20 to 100 mm. These exit opens can be different diameter sizes as well as graduating up or down throughout the component 10.

Typically, the bottom layer 14 is relatively impervious to airflow as compared to airflow channels 20. Similarly, top layer 12 can include regions 40 relatively impervious to airflow as compared to channels 20. Such impervious regions can result in most of the flow being confined to the airflow channels, Top layer 12 can also include air leaky regions 38 that will allow flow out of the airflow channels. In general, the impervious regions of bottom layer 14 and top layer 12 are formed from knitted fabric that is more densely knitted than the air leaky regions 38. In a refinement, padding component 10 can also include an edge seal 44.

Figure 3A:
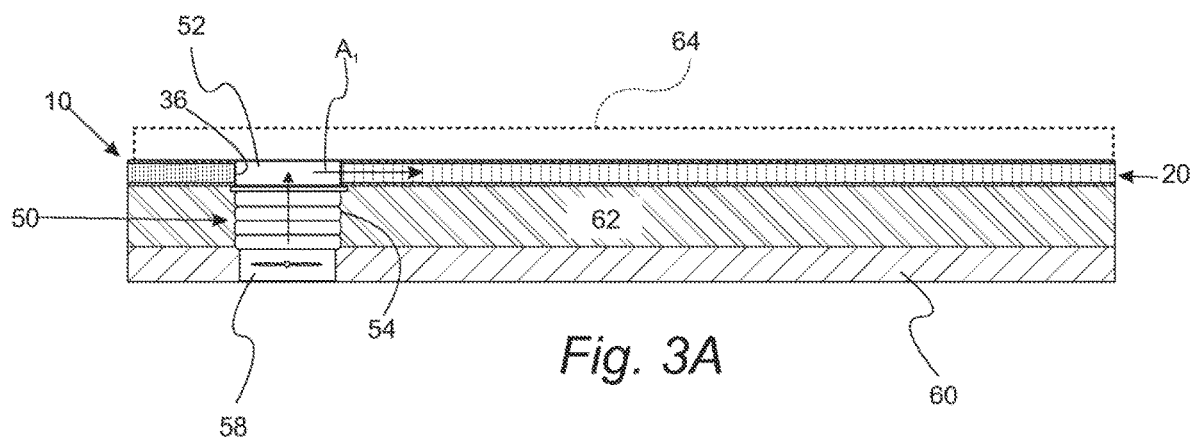
FIG. 3A is a cross-section illustrating a portion of a vehicle seat having the padding component of FIG. 1 integrated therein.
Figure 3B:
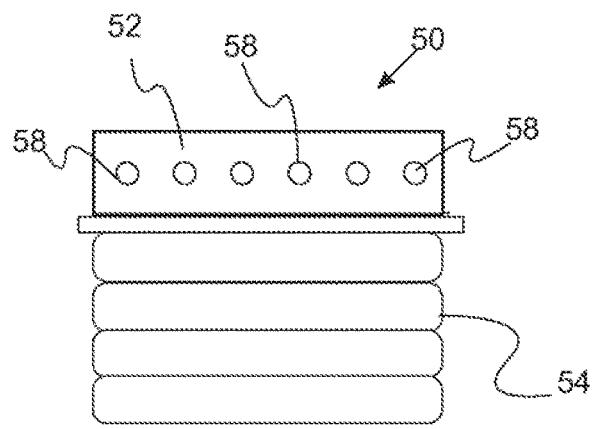
FIG. 3B showing an example of the snorkel air distributor that attaches to the inlet opening.
Figure 5:
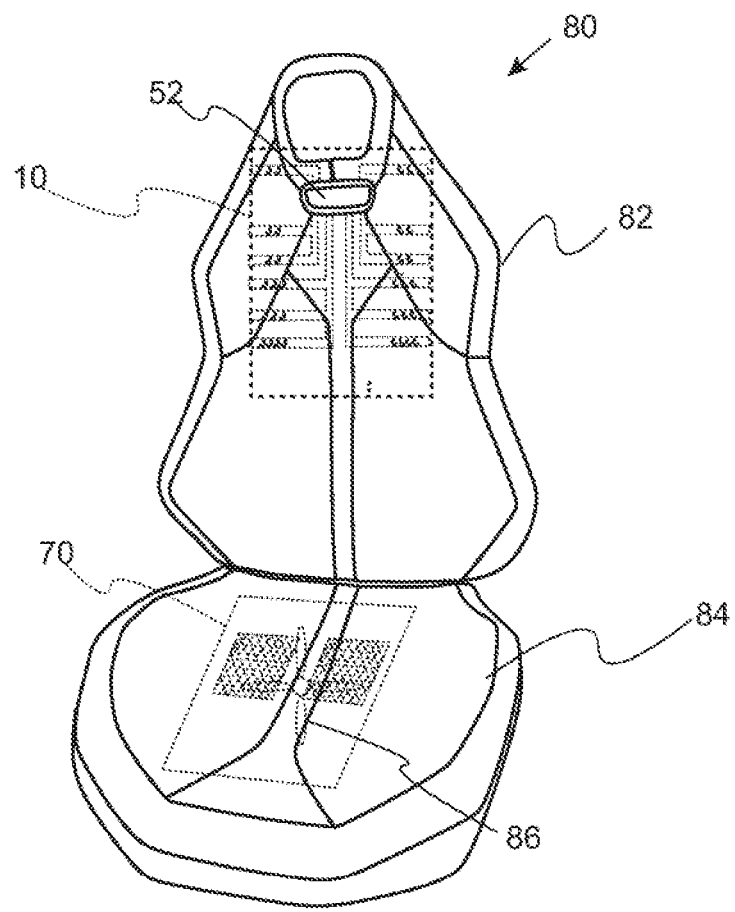
FIG. 5 is a perspective view illustrating a vehicle seat having the intelligent air distribution component of FIG. 1 integrated therein.

With references to FIGS. 3A, 3B, and 5, a schematics illustrating the incorporation of the padding component into a vehicle seat are provided. FIG. 3A is a schematic side view of a portion of a vehicle seat having an incorporated air distributor while FIG. 3B is a side view of the air distributor. FIG. 5 is a perspective view of an entire vehicle seat. Flow distributor 50 can be incorporated and inserted into the padding component 10 through inlet opening 36. Flow distributor 50 includes distributor head 52 and tubular section 54. Tubular section 54 can receive flowing air from blower or fan 58 that is directed to distributor head 52. The air which is optionally heated, cooled or ambient flows from openings 58 in the distributor head 52 through channels 20 as indicated by airflow arrow $A_1$. As depicted in FIG. 3A, the air distributor 50 is mounted between vehicle seat structural component 60 (e.g., a set flume) and padding component 10. An optional foam layer 62 can be interposed between vehicle seat structural component 60 and padding component 10. In one refinement, top layer 20 of padding component 10 can function as the A-surface (i.e., the viewable side) of the vehicle seat. In another refinement, an A-surface fabric 64 is disposed over top layer 20.

Figure 4A:
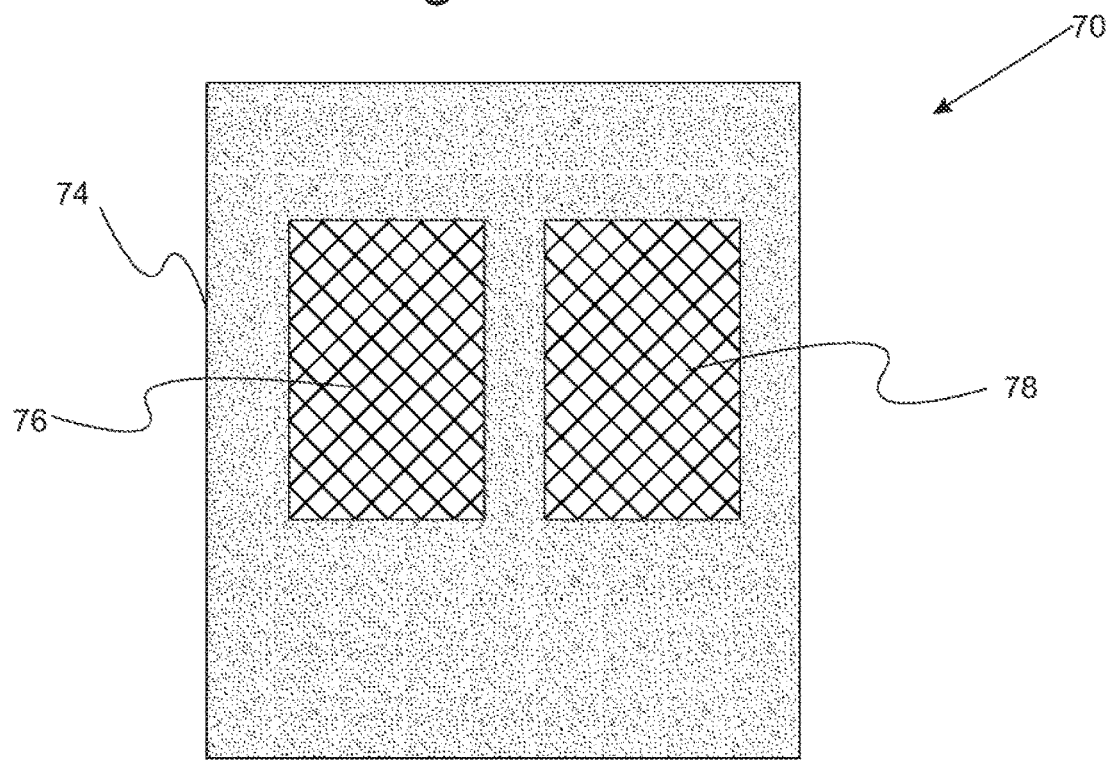
FIG. 4A is a top view of a vehicle seat spacer layer that directs airflow to one or more predetermined areas.
Figure 4B:
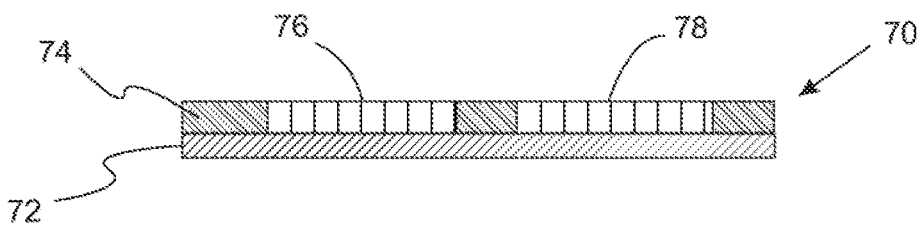
FIG. 4B is a top view of a vehicle seat spacer layer that directs airflow to one or more predetermined areas.

With reference to FIGS. 4A and 4B, schematic illustrations of a vehicle seat spacer layer that directs airflow to one or more predetermined areas is provided. Spacer layer 70 includes a bottom sublayer 72 and a top sublayer 74. Top sublayer 74 includes one or more predetermined regions 76 defining a plurality of openings that allow air to pass therethrough. Bottom sublayer 72 is a textile or fibrous layer that has at least some permeability to air follow.

With reference to FIGS. 1-5, a vehicle seat incorporating the padding components for intelligent distribution of airflow in a vehicle seat is provided. FIG. 5 depicts vehicle seat 80 having padding component 10 integrated therein into seatback 82. In the example depicted spacer layer 70 is incorporated into seat bottom 84. It should also be appreciated that padding component 10 can alternatively be integrated into seat bottom 84 and spacer material 70 can alternatively be incorporated into seatback 82. In a refinement, padding component 10 is integrated into vehicle seat back 82 or seat bottom 84 just below the A-side upholstery as depicted in FIG. 3A. In another refinement, top layer 12 is an A-surface. In another refinement, spacer material 70 is incorporated into seat bottom 84 with fan 86 blowing air through the openings.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A padding component for distributing airflow in a vehicle seat, the padding component comprising:
   a top layer defining airflow exit openings at predefined locations;
   a bottom layer; and
   a fibrous layer interposed between the top layer and the bottom layer, the fibrous layer defining airflow channels having a first filament density and non-channel regions having a second filament density, the second filament density being greater than the first filament density such that air preferentially flows through the airflow channels, wherein exiting air provide venting to a vehicle occupant.

2. The padding component of claim 1 wherein the bottom layer defines one or more inlet opening at predefined locations.

3. The padding component of claim 2 wherein the top layer defines at least one inlet opening allowing access ends of the airflow channels so that airflows therein.

4. The padding component of claim 3 wherein a flow distributor is positioned through the inlet opening, the flow distributor directing flowing air to the airflow channels.

5. The padding component of claim 3 wherein flow distributor includes a distributor head and tubular section, the tubular section receiving flowing air from blower or fan.

6. The padding component of claim 1 wherein filaments extend from the bottom layer to the top layer.

7. The padding component of claim 1 wherein the top layer and the bottom layer are knitted layers that can be different knit structures and densities respectively to allow specific locations for air inflow and air exit points as designed for specific system requirements.

8. The padding component of claim 7 wherein the knitted layers are selected from the group consisting of polyester, cotton/polyester blends, cotton/spandex blends, wool, nylon, rayon, conductive, monofilaments, bi-components, multi-filament and combinations thereof.

9. The padding component of claim 1 wherein air flowing through the airflow channels is heated air, ambient air or cooled air.

10. The padding component of claim 1 wherein the second filament density is at least 5 times greater than the first filament density.

11. The padding component of claim 1 wherein the second filament density is at least 10 times greater than the first filament density.

12. The padding component of claim 1 wherein the top layer and/or the bottom layer is relatively impervious to airflow as compared to the airflow channels.

13. The padding component of claim 1 wherein the top layer includes regions that are impervious to airflow as compared to the airflow channels.

14. A vehicle seat comprising:
    a seatback;
    a seat bottom; and
    a padding component integrated into one or both of the seatback or seat bottom, the padding component including:
       a top layer defining airflow exit openings at predefined locations;
       a bottom layer; and
       a fibrous layer interposed between the top layer and the bottom layer, the fibrous layer defining airflow channels having a first filament density and non-channel regions having a second filament density, the second filament density being greater than the first filament density such that air preferentially flows through the airflow channels, wherein exiting air provide venting to a vehicle occupant.

15. The vehicle seat of claim 14 wherein the top layer defines an inlet opening allowing access ends of the airflow channels so that airflows therein a plurality of exit openings that allow air to exit the airflow channels.

16. The vehicle seat of claim 15 wherein a flow distributor is positioned through the inlet opening, the flow distributor directing flowing air to the airflow channels, the flow distributor includes a distributor head and tubular section, the tubular section receiving flowing air from blower or fan.

17. The vehicle seat of claim 14 wherein filaments extends from the bottom layer to the top layer.

18. The vehicle seat of claim 14 wherein the top layer and the bottom layer are each independently knitted layers.

19. The vehicle seat of claim 14 wherein the top layer and/or the bottom layer is relatively impervious to airflow as compared to the airflow channels.

20. The vehicle seat of claim 14 further comprising a spacer including a bottom sublayer and a top sublayer, the top sublayer having one or more predetermined regions defining a plurality of openings that allow air to pass therethrough.

* * * * *